Patented Dec. 21, 1943

2,337,460

UNITED STATES PATENT OFFICE 2,337,460

FORMATION OF THIN FILMS UPON GLASS SURFACES

Preston W. French, Wilkinsburg, Pa., assignor to Pittsburgh Plate Glass Company, Allegheny County, Pa., a corporation of Pennsylvania No Drawing. Application February 25, 1942, Serial No. 432,255

4 Claims. (Cl. 117—124)

The present invention relates to the formation of thin inorganic films upon the surfaces of glass and it has particular relation to the preparation of films of calcium compounds of such thickness and refractive index as substantially to reduce reflection from the surface to which the films are applied.

It has heretofore been proposed to reduce reflection from glass surfaces by superposing thereupon films of organic material of a thickness approximately corresponding to one quarter the wave length of visible light and having an index of refraction such that the reflection at the interface of the air and the film approximately equals the reflection at the interface of the film and the glass surface upon which the film is superposed. The two reflections, therefore, are opposed in phase and tend to counteract each other to overcome reflection from the surface. In this way the objectionable mirror images from the surface of the glass are obviated and the light transmission of the glass is enhanced. These organic films, however, are only about twelve millionths of an inch in thickness and are so exceedingly delicate that they cannot withstand ordinary usage to which most surfaces are subjected.

In order to provide more durable films it has heretofore been proposed to leach out some of the more soluble constituents of glass, such as the alkali and alkali earth metal compounds with acids, thus in effect providing skeletal films highly rich in silica. These films, if of proper thickness, to some extent tend to obviate reflection from the glass surface and are of sufficient strength and hardness to be relatively durable in service. However, it is found that the indices of refraction with respect to the film and the surface of the glass are not such as to produce an adequate degree of counterbalancing of the reflections at the interface between the film and the glass and the interface between the film and the atmosphere.

In accordance with the provisions of the present invention it is proposed to obviate or at least reduce the foregoing difficulties by forming upon the surfaces of the glass films rich in calcium fluoride and of such thickness as to inhibit or reduce the reflection from the surface.

In order to form a non-reflecting film of calcium fluoride, various methods may be employed. One convenient method comprises initially etching the surface of the glass with a fairly dilute, i. e., 1 or 2 normal acid, such as nitric, hydrochloric or sulphuric. The acid solution may, also, include a soluble compound of calcium, preferably a calcium salt of the acid employed in the treatment, e. g., calcium chloride or nitrate in a concentration, for example of 0.1 to 10.0% by weight. The reaction may be promoted by immersing the glass to be treated in the solution in an autoclave at an elevated temperature, e. g., 200 to 400° C. The treatment is continued until a substantial amount of the alkali compounds have been leached out, for example, to a depth of about twelve millionths of an inch. The resultant film consists essentially of silica, calcium salts and water. Normal atmospheric pressures may also be employed in the leaching operation. However, a longer period will be required.

The glass may be removed from the acid bath, washed, dried and placed in a chamber where the surfaces are treated with hydrogen fluoride gas mixed with air or an inert gas, such as nitrogen or carbon dioxide. The concentration of hydrogen fluoride in the chamber is controlled so that the reaction with the silica in the films proceeds fairly slowly. A concentration of hydrofluoric acid of about 12 percent in air would appear to be satisfactory. As a result of the action of the hydrogen fluoride, the silica in the films is converted largely into silicon tetrafluoride, which is volatilized to leave a film probably of a skeletal nature and consisting substantially of calcium fluoride. The conditions are adjusted to obtain a film which is non-reflective to a predetermined portion of the visible light spectrum, e. g., that of D. sodium. The films are then baked at about 200° C. for about 10 minutes to harden them and, finally, are washed to remove soluble salts and dried.

If desired, the hydrofluoric acid may be applied to the etched glass surface as a water solution rather than as a gas. In such process the glass is first treated with a water solution of a strong mineral acid, such as hydrochloric acid and a calcium salt of the acid at an elevated temperature, in order superficially to leach out the alkali from the surface of the glass. The conditions of operation are substantially those above described in the preliminary etching of the glass surface. The solution, at the end of the leaching operation, can be removed and the glass surface then treated with a water solution of hydrofluoric acid and a soluble fluoride, such as ammonium or sodium fluoride. The hydrofluoric acid and the soluble fluoride are both relatively dilute, e. g., in concentration respectively of 0.1 to 5% and 0.1 to 1.0% The hydrofluoric acid attacks the silica and the soluble fluoride, reacts with the calcium compounds to form insoluble calcium fluoride which can be baked to a hard, durable state. The silica in the surface is thus removed to leave a calcium fluoride film, which if it is properly regulated as to thickness, has reflection reducing properties.

Since glass inherently contains calcium which dissolves in acids to form salts, the addition of a soluble salt with the acid may not always be required.

The films obtained by the present method, in contradistinction to organic films are comparatively rugged and are relatively firmly united or bonded to the glass, and will withstand usage and weathering much better, and at the same time, the reflection reducing characteristics of the film are high.

The forms of the invention herein described are to be considered merely as exemplary. It will be apparent to those skilled in the art that numerous modifications may be made therein without departure from the spirit of the invention or the scope of the appended claims.

What I claim is:

1. A process of treating glass containing alkali metals, calcium compounds and silica, in order to form non-reflective films upon the surface thereof, which process comprises first treating a surface of the body with a strong mineral acid non-reactive with respect to silica and a soluble calcium compound, to leach out soluble alkalies and leave a surface film rich in calcium and silica compounds, then forming an adherent film highly rich in calcium fluoride upon the surface by treating it with hydrogen fluoride to remove silica and to convert the calcium compounds into said film of calcium fluoride, the hydrogen fluoride being in vapor phase.

2. A process of treating glass containing alkali metals, calcium compounds and silica, in order to form non-reflective films upon the surface thereof, which process comprises first treating a surface of the body with a strong mineral acid non-reactive with respect to silica and a soluble calcium compound, to leach out soluble alkalies and leave a surface film rich in calcium and silica compounds, then forming an adherent film highly rich in calcium fluoride upon the surface by treating it with hydrogen fluoride to remove silica and to convert the calcium compounds into said film of calcium fluoride, the hydrogen fluoride being in a solution containing a soluble fluoride salt.

3. A process of treating glass containing alkali metals, calcium compounds and silica, in order to form non-reflective films upon the surface thereof, which process comprises first treating a surface of the body with a strong mineral acid non-reactive with respect to silica and a soluble calcium compound, to leach out soluble alkalies and leave a surface film rich in calcium and silica compounds, then forming an adherent film highly rich in calcium fluoride upon the surface by treating it with hydrogen fluoride to remove silica and to convert the calcium compounds into said film of calcium fluoride, the hydrogen fluoride being in a solution containing a soluble fluoride salt and the surface being subsequently baked in order to harden the film.

4. A process of treating glass containing alkali metals, calcium compounds and silica, in order to form non-reflective films upon the surface thereof, which process comprises first treating a surface of the body with a strong mineral acid non-reactive with respect to silica and a soluble calcium compound, to leach out soluble alkalies and leave a surface film rich in calcium and silica compounds, then forming an adherent film highly rich in calcium fluoride upon the surface by treating it with hydrogen fluoride to remove silica and to convert the calcium compounds into said film of calcium fluoride, the film being of a thickness of approximately one-fourth wave length of visible light.

PRESTON W. FRENCH.